US012722647B2

(12) United States Patent
Han et al.

(10) Patent No.: US 12,722,647 B2
(45) Date of Patent: Sep. 1, 2026

(54) VEHICLE CONTROL METHOD AND VEHICLE

(71) Applicant: BYD COMPANY LIMITED, Shenzhen (CN)

(72) Inventors: Bing Han, Shenzhen (CN); Jiagang Ji, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 24 days.

(21) Appl. No.: 18/974,862

(22) Filed: Dec. 10, 2024

(65) Prior Publication Data

US 2025/0100566 A1 Mar. 27, 2025

Related U.S. Application Data

(63) Continuation of application No. PCT/CN2023/077641, filed on Feb. 22, 2023.

(30) Foreign Application Priority Data

Jun. 24, 2022 (CN) ........................ 202210730848.4

(51) Int. Cl.

| | |
|---|---|
| ***G07C 5/00*** | (2006.01) |
| ***B60W 50/02*** | (2012.01) |
| ***B60W 50/023*** | (2012.01) |
| ***G06F 9/445*** | (2018.01) |
| ***G07C 5/02*** | (2006.01) |
| ***G07C 5/04*** | (2006.01) |
| ***G07C 5/08*** | (2006.01) |

(52) U.S. Cl.

CPC .... *B60W 50/0225* (2013.01); *B60W 50/0205* (2013.01); *B60W 50/023* (2013.01); *G06F 9/44505* (2013.01)

(58) Field of Classification Search

CPC ......... B60W 50/0225; B60W 50/0205; B60W 50/023; G06F 9/44505

See application file for complete search history.

(56) References Cited

U.S. PATENT DOCUMENTS

2002/0154605 A1* 10/2002 Preston .................. B60R 25/00 370/254

2008/0172573 A1* 7/2008 Jansson .............. G06F 11/2035 714/15

(Continued)

FOREIGN PATENT DOCUMENTS

| | | |
|---|---|---|
| CN | 105677566 A | 6/2016 |
| CN | 109032945 A | 12/2018 |
| CN | 109710222 A | 5/2019 |

(Continued)

*Primary Examiner* — Kito R Robinson
*Assistant Examiner* — Anthony Gabriel Mora
(74) *Attorney, Agent, or Firm* — Calfee, Halter & Griswold LLP

(57) ABSTRACT

A vehicle control method and a vehicle. The method includes: obtaining running states of a plurality of control chips; when the running state of a first control chip in the plurality of control chips indicates that any of set events occurs in the first control chip, sending, to a second control chip among the plurality of control chips, a configuration instruction of running first application software, wherein the first application software is an application module currently run by the first control chip.

17 Claims, 5 Drawing Sheets

(56) References Cited

U.S. PATENT DOCUMENTS

| | | | |
|---|---|---|---|
| 2017/0308079 | A1 | 10/2017 | Bash et al. |
| 2021/0103504 | A1* | 4/2021 | Tsuchiya ............. G06F 11/0772 |

FOREIGN PATENT DOCUMENTS

| | | | |
|---|---|---|---|
| CN | 110011809 | A | 7/2019 |
| CN | 110379040 | A | 10/2019 |
| CN | 112860249 | A | 5/2021 |
| CN | 114148269 | A | 3/2022 |

* cited by examiner

S7100

Receive a configuration instruction sent by a processor

S7200

Run first application software in response to the configuration instruction, where the first application software is application software currently run by a first control chip, and the first control chip is a control chip in which any of set events occurs in a plurality of control chips of a vehicle

VEHICLE CONTROL METHOD AND VEHICLE

CROSS-REFERENCE TO RELATED APPLICATIONS

The present disclosure is a bypass continuation of PCT International Application of PCT/CN2023/077641, filed on Feb. 22, 2023, which claims priority to Chinese Patent Application No. 202210730848.4, entitled "VEHICLE CONTROL METHOD, VEHICLE, AND COMPUTER-READABLE STORAGE MEDIUM" and filed on Jun. 24, 2022, which are incorporated herein by reference in their entireties.

FIELD

The present disclosure relates to the field of electric vehicles, and more specifically, to a vehicle control method and a vehicle.

BACKGROUND

With continuous development of automotive intelligence, automotive software is becoming more complex, and a higher requirement is also put forward for scalability and reliability of in-vehicle software that supports automatic driving.

For an existing in-vehicle software architecture, in-vehicle software is generally bound to underlying hardware. However, when a processor resource at a underlying layer is limited, functions of some in-vehicle software are invalidated. Alternatively, when a processor at the underlying layer is faulty, in-vehicle software run by the processor completely fails, affecting reliability of the in-vehicle software.

SUMMARY

Currently, in-vehicle software is bound to underlying hardware, causing a problem that in-vehicle software run by a processor fails when the processor is faulty.

A first objective of the present disclosure is to provide a new technical solution of a vehicle control method applied to a processor.

A second objective of the present disclosure is to provide a new technical solution of a vehicle control method applied to a control chip.

A third objective of the present disclosure is to provide a new technical solution for a vehicle.

A first aspect of the present disclosure provides a vehicle control method. The method includes:

Running states of a plurality of control chips are obtained.

A configuration instruction of running first application software is sent to a second control chip in the plurality of control chips when a running state of a first control chip in the plurality of control chips indicates that any of set events occurs in the first control chip. The first application software is application software currently run by the first control chip.

According to an embodiment of the present disclosure, the set event includes at least one of a running fault and resource usage exceeding a first threshold.

According to an embodiment of the present disclosure, the set event includes the running fault, and that a configuration instruction of running first application software is sent to a second control chip in the plurality of control chips when a running state of a first control chip in the plurality of control chips indicates that any of set events occurs in the first control chip includes:

A first configuration instruction of running all first application software is sent to the second control chip when the running state of the first control chip indicates that a running fault occurs in the first control chip.

According to an embodiment of the present disclosure, the set event includes the resource usage exceeding the first threshold, and that a configuration instruction of running first application software is sent to a second control chip in the plurality of control chips when a running state of a first control chip in the plurality of control chips indicates that any of set events occurs in the first control chip includes:

A second configuration instruction of running some first application software is sent to the second control chip when the running state of the first control chip indicates that resource usage of the first control chip exceeds the first threshold.

According to an embodiment of the present disclosure, that a second configuration instruction of running some first application software is sent to the second control chip includes:

Based on a first parameter of all first application software currently run by the first control chip, some first application software is selected from all the first application software, and the second configuration instruction of running the some first application software is sent to the second control chip.

The first parameter includes at least one of a load value and a priority.

According to an embodiment of the present disclosure, the first parameter is a load value, and the some first application software is first application software having a largest load value in all the first application software.

According to an embodiment of the present disclosure, the first parameter is a priority, and the some first application software is first application software having a lowest priority in all the first application software.

According to an embodiment of the present disclosure, the second control chip is any one of control chips in which the set event does not occur in the plurality of control chips.

Alternatively, the second control chip is a control chip in which the set event does not occur and that has a smallest load value in the plurality of control chips.

According to an embodiment of the present disclosure, after the configuration instruction of running the first application software is sent to the second control chip in the plurality of control chips, the method further includes:

A first message is sent to second application software, to cause the second application software to communicate with the first application software run by the second control chip.

The second application software is application software that interacts with the first application software.

A second aspect of the present disclosure provides a vehicle control method. The method includes:

A configuration instruction sent by a processor is received.

First application software is run in response to the configuration instruction.

The first application software is application software currently run by a first control chip, and the first control chip is a control chip in which any of set events occurs in a plurality of control chips of a vehicle.

According to an embodiment of the present disclosure, a software architecture of the vehicle includes middleware, the middleware includes multiple atomization services, and that first application software is run includes:

An atomization service corresponding to the first application software is selected from the multiple atomization services.

The atomization service corresponding to the first application software is invoked, and service data of the atomization service corresponding to the first application software is obtained, to generate a control instruction based on the service data.

A corresponding processor is controlled to execute a function corresponding to the first application software according to the control instruction.

A third aspect of the present disclosure provides a vehicle. The vehicle includes: a memory, configured to store computer-executable instructions; and a processor, configured to perform the vehicle control method according to the first aspect of the present disclosure based on control of the computer-executable instructions.

Other features and advantages of the present disclosure will become apparent from the following detailed descriptions of exemplary embodiments of the present disclosure with reference to the drawings.

BRIEF DESCRIPTION OF THE DRAWINGS

Accompanying drawings are incorporated into and constitute a part of this specification, show embodiments that conform to the present disclosure, and are used together with this specification to describe the principle of the present disclosure.

DETAILED DESCRIPTION

Various exemplary embodiments of the present disclosure are now be described in detail with reference to the accompanying drawings. It should be noted that, unless otherwise specified, opposite arrangement, numerical expressions, and numerical values of components and steps described in these embodiments do not limit the scope of the present disclosure.

The following descriptions of at least one exemplary embodiment are merely illustrative, and in no way constitute any limitation on the present disclosure and application or use of the present disclosure.

Technologies, methods, and devices known to those of ordinary skill in related arts may not be discussed in detail, but where appropriate, the techniques, the methods, and the devices should be considered as a part of this specification.

In all examples shown and discussed herein, any specific value should be construed as merely an example and not as limitations. Therefore, other examples of exemplary embodiments may have different values.

It should be noted that similar numbers and letters represent similar items in the following accompanying drawings. Therefore, once an item is defined in one accompanying drawing, the item does not need to be further discussed in the subsequent accompanying drawings.

The following describes a vehicle control method provided in embodiments of the present disclosure in detail with reference to the accompanying drawings.

Figures 1, 2:
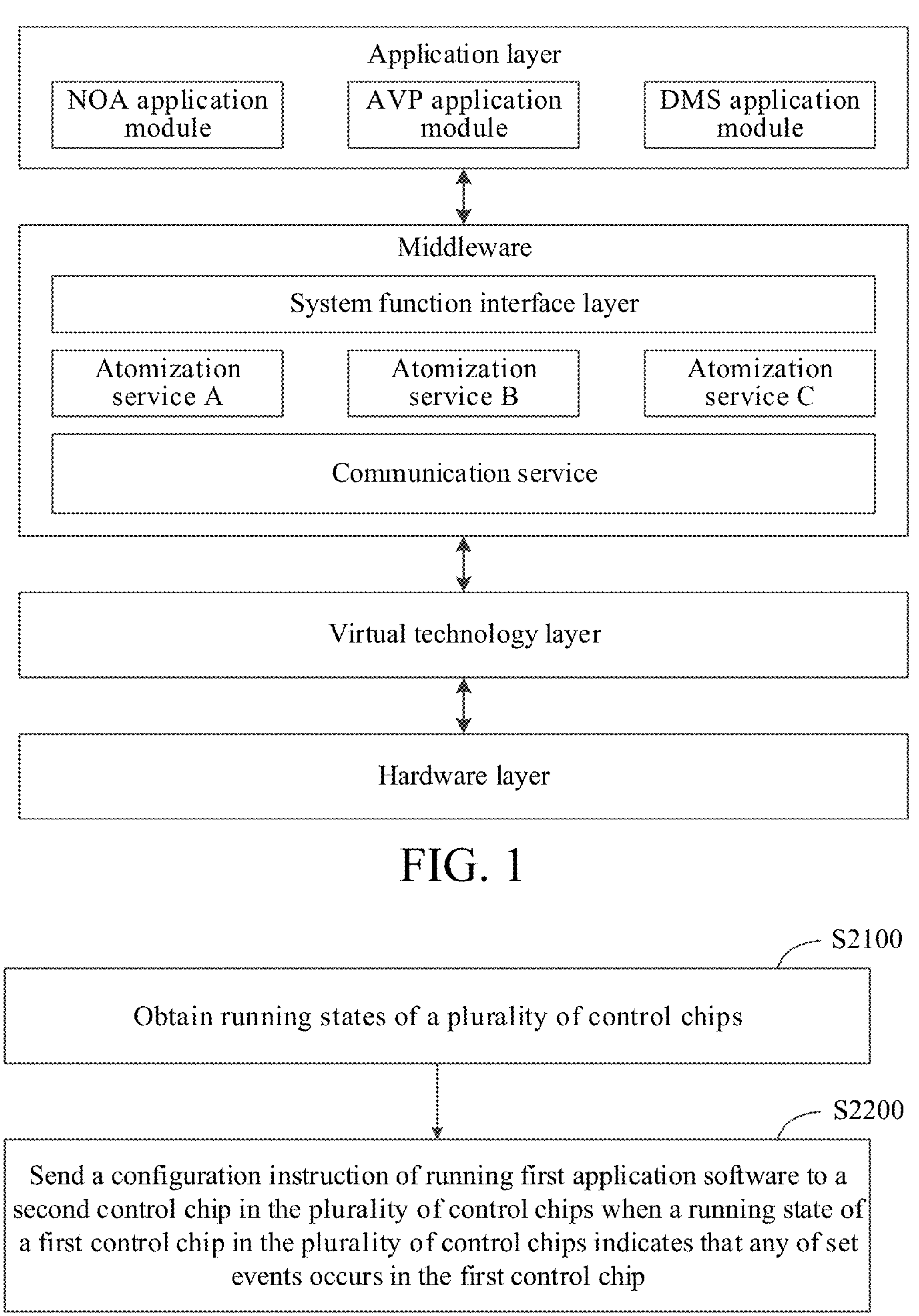
FIG. 1 is a schematic diagram of a software architecture of a vehicle according to an embodiment of the present disclosure.
FIG. 2 is a schematic flowchart 1 of a vehicle control method according to an embodiment of the present disclosure.

As shown in FIG. 1, a software architecture of a vehicle that implements the vehicle control method successively includes a hardware layer, a virtual technology layer, middleware, and an application layer from bottom to top.

The hardware layer includes a processor and a plurality of control chips. The processor is configured to configure application software run by the plurality of control chips. The control chip is configured to run application software at the application layer. The processor may be, for example, a microcontroller unit (Microcontroller Unit, MCU). The control chip may be, for example, a system on chip (System on Chip, SOC).

The virtual technology layer may provide a virtual machine environment for different operating systems. The virtual machine (Virtual Machine) environment is a complete computer system that is simulated by software and that has a complete hardware system function and runs in a completely isolated environment.

The middleware includes a system function interface layer, a communication service, and multiple atomization services. For example, as shown in FIG. 1, the middleware includes an atomization service A, an atomization service B, and an atomization service C. The system function interface layer is configured to access the communication service and each atomization service. Application software run by different control chips may communicate by using the communication service. The atomization service is a non-decomposable basic service unit that constitutes an application, and is also a minimum unit that an operating system can manage and allocate a permission to. The atomization service may be shared by multiple application software. It may be understood herein that the atomization service may be designed based on application software to be run. For example, the atomization service may include a video service, a millimeter wave radar service, a lidar service, a location service, a camera service, or the like.

The application layer includes multiple application software. In an automatic driving scenario, the application layer may include but is not limited to navigate on autopilot (Navigate on Autopilot, NOA) application software, autonomous valet parking (Autonomous Valet Parking, AVP) application software, driver monitoring system (Driver Monitoring System, DMS) application software, and the like. The NOA application software can enable an auto-assisted navigation driving function, to automatically control a vehicle to drive into or out of a high-speed branch or an exit based on a destination entered by a user. The AVP application software can enable an autonomous valet parking function. When the autonomous valet parking function is enabled, the vehicle can be controlled to automatically search for a parking space and park, or the vehicle can be called to automatically drive out and wait at a specified location. The DMS application software can enable a fatigue monitoring function. The DMS application software can use a facial feature, an eye signal, a head movement, or the like of a driver to infer a fatigue state of the driver, give an alarm prompt, and take corresponding measures.

In a running process, in response to a triggering operation performed by the user on application software, the application layer 11 may invoke an atomization service corresponding to the application software in the middleware, to obtain a function corresponding to the application software. The NOA application software is used as an example. The video service, the millimeter wave radar service, the lidar service, and the location service may be invoked to perform obstacle perception to obtain a perception result. A control instruction is generated based on the perception result, and the control instruction is sent to a corresponding processor, to cause the processor to execute the control instruction, thereby implementing a corresponding function of the NOA application software.

According to this embodiment of the present disclosure, by designing the atomization service of the middleware, application software at the application layer can be decoupled from lower-layer software and hardware, and application software can be flexibly deployed on different control chips at the hardware layer. In addition, redundancy protection on a fault of a control chip can be implemented, thereby ensuring normal running of all application software, and improving reliability of running of the software architecture of the vehicle.

FIG. 2 is a schematic flowchart of a vehicle control method according to an embodiment of the present disclosure. The vehicle control method is implemented by a processor. The processor is communicatively connected to a plurality of control chips. As shown in FIG. 2, the vehicle control method may include step S2100 and step S2200.

Step S2100: Running states of the plurality of control chips are obtained.

Step S2200: A configuration instruction of running first application software is sent to a second control chip in the plurality of control chips when a running state of a first control chip in the plurality of control chips indicates that any of set events occurs in the first control chip. The first application software is application software currently run by the first control chip.

In this embodiment, when a running fault occurs in a control chip, application software run by the control chip fails. In addition, when a resource of the control chip reaches a bottleneck, the application software run by the control chip is also affected. In view of this, the set event includes at least one of a running fault and resource usage exceeding a first threshold.

A running state may be used to determine whether any of the set events occurs in the control chip. For example, the running state may be a communication state of the control chip, and it may be determined, based on the communication state of the control chip, whether a running fault occurs in the control chip. Specifically, a heartbeat signal sent by the control chip may be monitored to determine whether the communication state of the control chip is normal, and when the communication state of the control chip is abnormal, it is determined that the running fault occurs in the control chip.

For example, the running state may include resource usage of the control chip. Specifically, the resource usage of the control chip may be obtained, the resource usage of the control chip is compared with the first threshold, and it may be determined, based on the resource usage of the control chip, whether the resource usage of the control chip exceeds the first threshold, that is, it is determined whether the resource of the control chip reaches an upper limit. It may be understood herein that the resource usage may be CPU usage or memory usage.

In an embodiment, the second control chip is configured to run the first application software currently run by the first control chip in which the set event occurs. The second control chip may be any one of control chips in which the set event does not occur in the plurality of control chips.

For example, the second control chip may be a control chip specified in the plurality of control chips. In other words, the plurality of control chips include an alternative second control chip, and the second control chip is in an idle state when the set event does not occur in the plurality of control chips. In this way, because resources of the alternative second control chip are sufficient, normal running of the first application software can be ensured, and normal running of application software on another control chip is prevented from being affected.

For example, the second control chip may be a control chip in which the set event does not occur and that has a smallest load value in the plurality of control chips. In this way, when the set event occurs in the first control chip in the plurality of control chips, the first application software run by the first control chip may be migrated to a control chip having a smallest load value in the other control chips, so that normal running of the first application software currently run by the first control chip can be ensured. In addition, normal running of application software on the second control chip can be prevented from being affected because a resource of the second control chip reaches an upper limit.

Processes of configuring a control chip when different set events occur in the control chip are described below by using specific embodiments.

In an embodiment, the set event includes the running fault, and that a configuration instruction of running first application software is sent to a second control chip in the plurality of control chips when a running state of a first control chip in the plurality of control chips indicates that any of set events occurs in the first control chip includes: A first configuration instruction of running all first application software is sent to the second control chip when the running state of the first control chip indicates that a running fault occurs in the first control chip.

Figure 3:
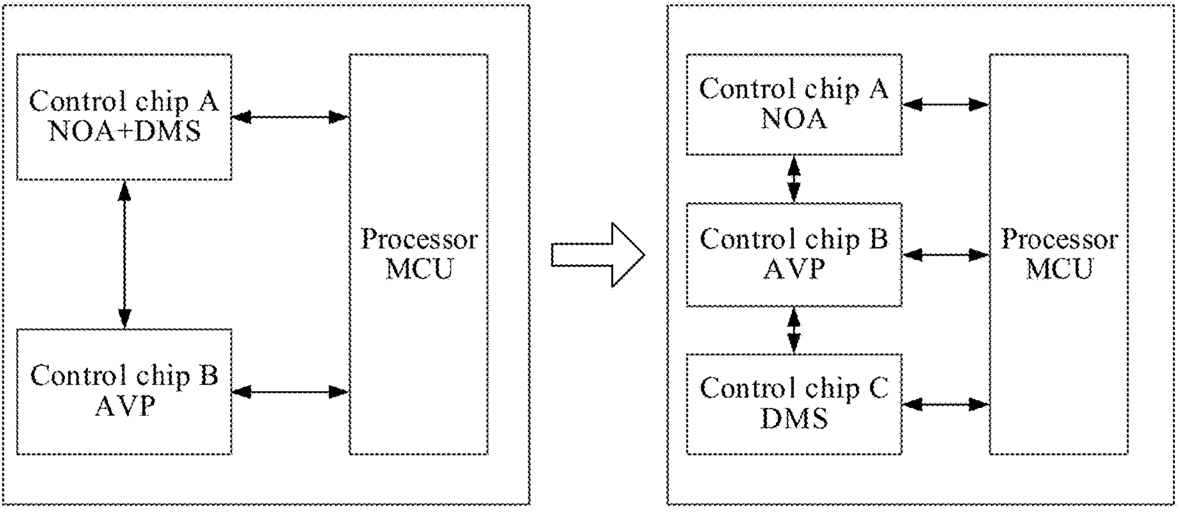
FIG. 3 is a schematic diagram 1 of a control chip configuration process according to an embodiment of the present disclosure.

A configuration process shown in FIG. 3 is used as an example. A hardware layer of a software architecture includes a control chip A, a control chip B, and a control chip C. The control chip A runs NOA application software, the control chip B runs AVP application software, and the control chip C runs DMS application software. Running states of the control chip A, the control chip B, and the control chip C are separately obtained. When a running fault occurs in the control chip C, a first configuration instruction is sent to the control chip B if a load value of the control chip B is smallest, to cause the control chip B to run the DMS application software, that is, the control chip B runs the AVP application software and the DMS application software after the application software is redeployed.

In this embodiment, when a running fault occurs in a control chip in the plurality of control chips, application software currently run by the control chip may be dynamically deployed on another control chip, so that redundancy protection on a fault of a control chip can be implemented, thereby preventing a running fault of a control chip from affecting running of another application software, and improving reliability of running the software architecture of a vehicle.

In another embodiment, the set event includes the resource usage exceeding the first threshold, and that a configuration instruction of running first application software is sent to a second control chip in the plurality of control chips when a running state of a first control chip in the plurality of control chips indicates that any of set events occurs in the first control chip includes: A second configuration instruction of running some first application software is sent to the second control chip when the running state of the first control chip indicates that resource usage of the first control chip exceeds the first threshold.

In this embodiment, that a second configuration instruction of running some first application software is sent to the second control chip may further include: Based on a first parameter of all first application software currently run by the first control chip, some first application software is selected from all the first application software, and the second configuration instruction of running the some first application software is sent to the second control chip.

Based on the first parameter, the some first application software may be selected from all the first application software currently run by the first control chip. Optionally, the first parameter includes at least one of a load value and a priority. A load value of application software may reflect a quantity of resources required for running the application software. A priority of application software may reflect importance of a service corresponding to the application software. A higher priority of the application software indicates greater importance of the service corresponding to the application software.

The some first application software may be one or more of the first application software currently run by the first control chip.

For example, when the first parameter is a load value, the some first application software is first application software having a largest load value in all the first application software. In this way, when the resource usage of the first control chip exceeds the first threshold, the first application software having the largest resource usage on the first control chip is migrated to the second control chip for running, so that the resource usage of the first control chip can be effectively reduced, thereby ensuring normal running of another first application software on the first control chip.

For example, when the first parameter is a load value, a preset amount of first application software in all the first application software is run on the second control chip based on load values of the first application software. For example, two pieces of first application software having more load values in all the first application software currently run by the first control chip may be used as the some first application software and run on the second control chip. In this way, when the resource usage of the first control chip exceeds the first threshold, multiple first application software in all the first application software currently run by the first control chip is migrated to the second control chip for running, so that running pressure of the first control chip can be effectively relieved, thereby ensuring normal running of another first application software on the first control chip.

For example, when the first parameter is a priority, the some first application software is first application software having a lowest priority in all the first application software. In this way, when the resource usage of the first control chip exceeds the first threshold, the first application software having the lowest priority in all the first application software currently run by the first control chip is migrated to the second control chip for running, so that execution of an important service can be prevented from being affected, thereby ensuring reliability of running of the software architecture of the vehicle.

For example, when the first parameter is a priority, a preset amount of first application software in all the first application software is run on the second control chip based on priorities of the first application software. In this way, running pressure of the first control chip can be effectively relieved, thereby ensuring normal running of another first application software on the first control chip. In addition, execution of an important service can be prevented from being affected, thereby ensuring reliability of running of the software architecture of the vehicle.

Figure 4:
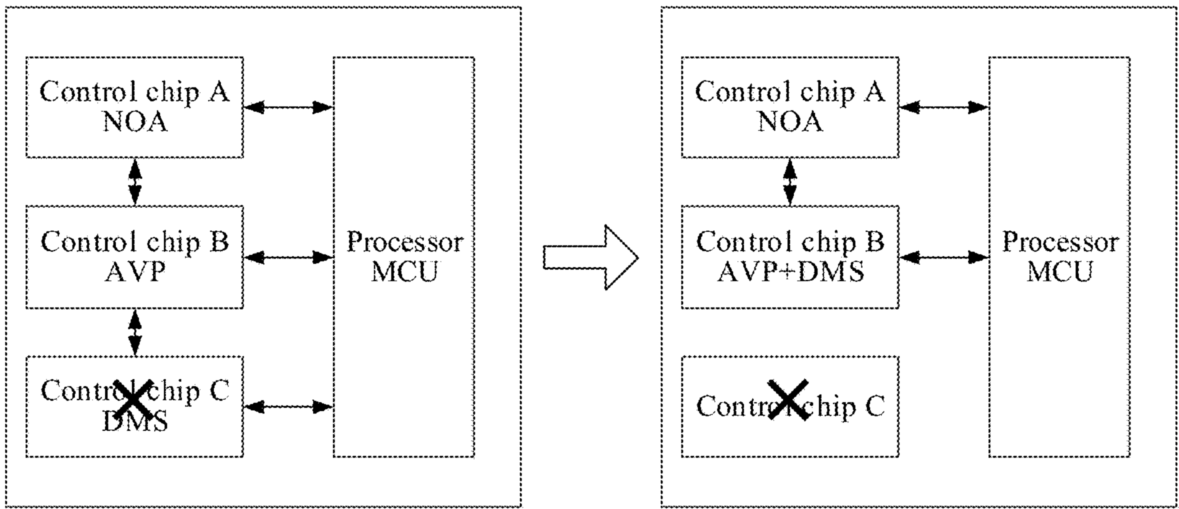
FIG. 4 is a schematic diagram 2 of a control chip configuration process according to an embodiment of the present disclosure.

The following describes this embodiment by using a configuration process shown in FIG. 4. As shown in FIG. 4, a hardware layer of a software architecture includes a control chip A and a control chip B. The control chip A runs NOA application software and DMS application software, and the control chip B runs AVP application software. The hardware layer of the software architecture further includes an alternative control chip C. Resource usage of the control chip A and resource usage of the control chip B are separately obtained. When the resource usage of the control chip B exceeds the first threshold, a second configuration instruction is sent to the control chip C, to cause the control chip C to run the DMS application software having a largest load value. In other words, after the application software is redeployed, the control chip A runs the NOA application software, the control chip B runs the AVP application software, and the control chip C runs the DMS application software.

In this embodiment, when resource usage of a control chip in the plurality of control chips exceeds the first threshold, some application software currently run by the control chip may be redeployed to another control chip, so that running pressure of the first control chip can be effectively relieved, thereby ensuring normal running of another first application software on the first control chip, and making the software architecture of the vehicle have better scalability.

In an embodiment, after the configuration instruction of running the first application software is sent to the second control chip in the plurality of control chips, the method further includes: A first message is sent to second application software, to cause the second application software to communicate with the first application software run by the second control chip. The second application software is application software that interacts with the first application software.

Specifically, the second application software may establish a communication connection to the first application software by using a communication service in middleware of the software architecture.

In this embodiment, the configuration instruction of running the first application software is sent to the second control chip in the plurality of control chips, and the first message is sent to the second application software that interacts with the first application software, to notify the second application software to communicate with the redeployed first application software, thereby ensuring normal running of the second application software.

Figure 5:
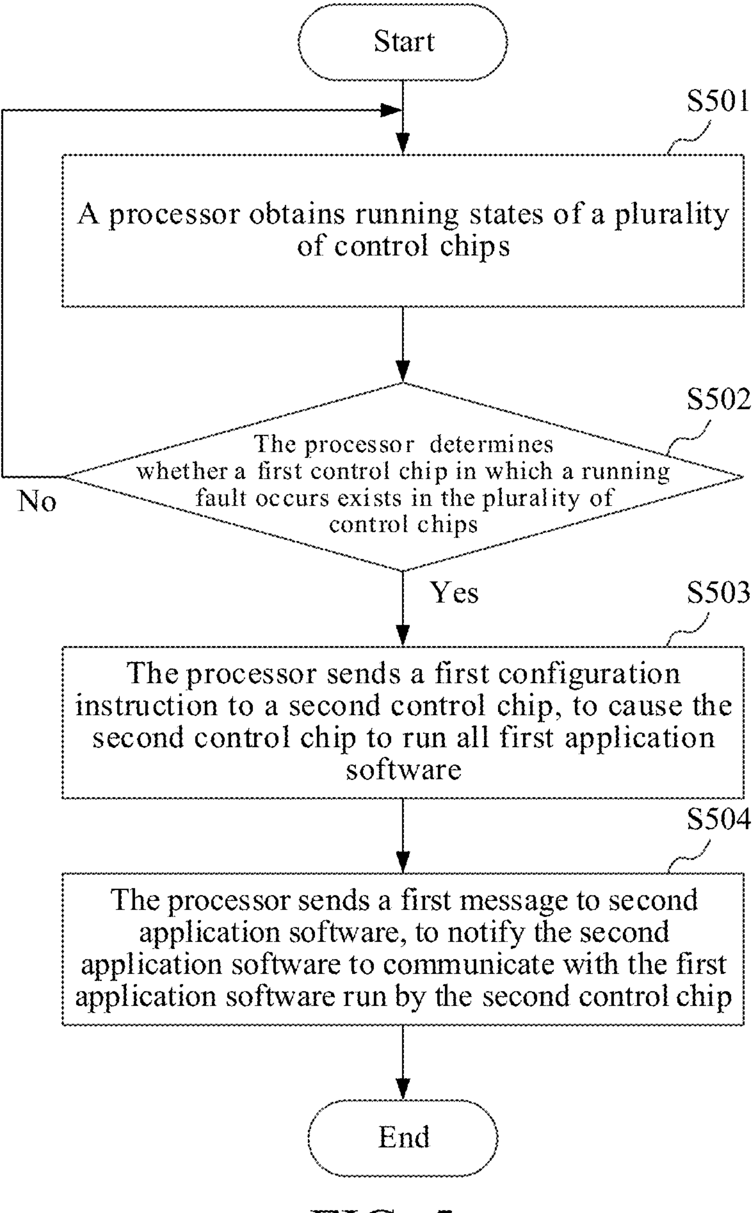
FIG. 5 is a schematic flowchart 2 of a vehicle control method according to an embodiment of the present disclosure.

The following uses a specific example to describe a vehicle control method. With reference to FIG. 5, the vehicle control method includes the following steps.

Step S501: A processor obtains running states of a plurality of control chips.

Step S502: The processor determines whether a first control chip in which a running fault occurs exists in the plurality of control chips; and performs step S503 if yes; otherwise, performs step S501.

Step S503: The processor sends a first configuration instruction to a second control chip, to cause the second control chip to run all first application software.

The first application software is application software currently run by the first control chip.

Step S504: The processor sends a first message to second application software, to notify the second application software to communicate with the first application software run by the second control chip.

The second application software is application software that interacts with the first application software.

In this example, when a running fault occurs in a control chip in the plurality of control chips, application software currently run by the control chip may be dynamically deployed on another control chip, so that redundancy protection on a fault of a control chip can be implemented, thereby preventing a running fault of a control chip from affecting running of another application software, and improving reliability of running a software architecture of a vehicle.

Figures 6, 7:
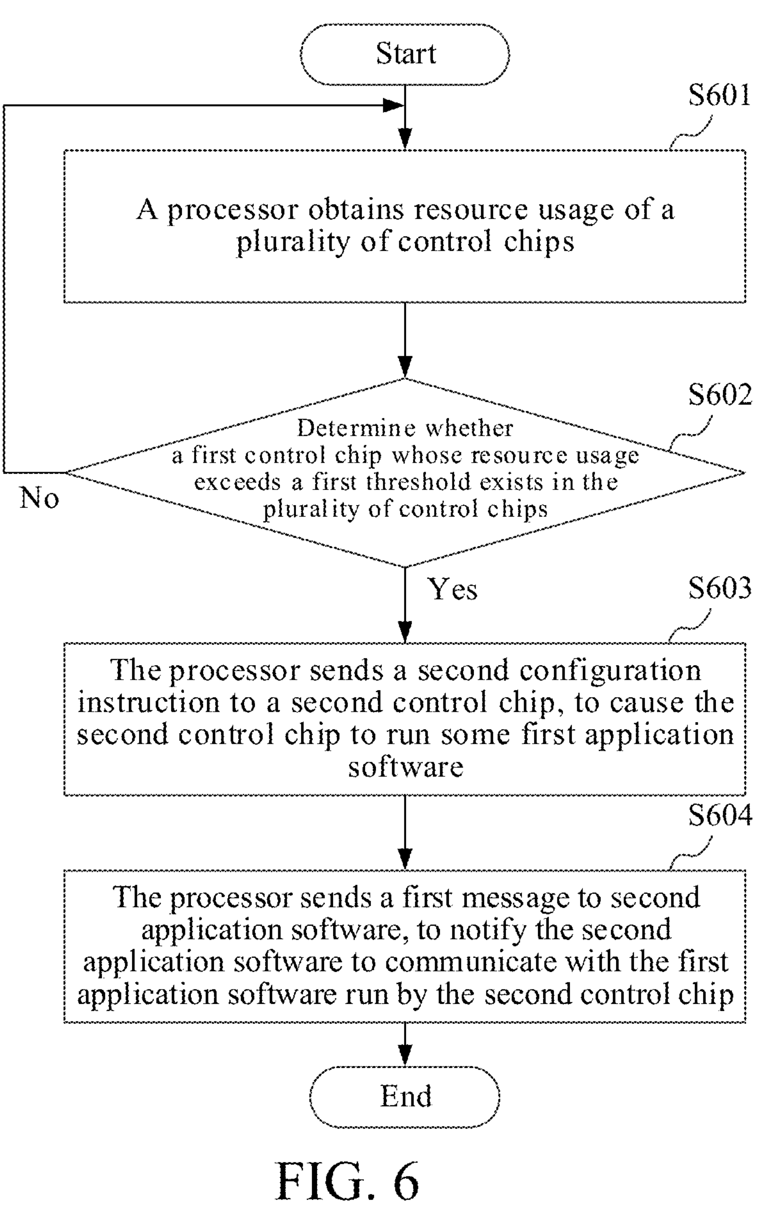
FIG. 6 is a schematic flowchart 3 of a vehicle control method according to an embodiment of the present disclosure.
FIG. 7 is a schematic flowchart 4 of a vehicle control method according to an embodiment of the present disclosure.

The following uses another specific example to describe a vehicle control method. With reference to FIG. 6, the vehicle control method includes the following steps.

Step S601: A processor obtains resource usage of a plurality of control chips.

Step S602: The processor determines whether a first control chip whose resource usage exceeds a first threshold exists in the plurality of control chips; and performs step S603 if yes; otherwise, performs step S601.

Step S603: The processor sends a second configuration instruction to a second control chip, to cause the second control chip to run some first application software.

The first application software is application software currently run by the first control chip.

Step S604: The processor sends a first message to second application software, to notify the second application software to communicate with the first application software run by the second control chip.

The second application software is application software that interacts with the first application software.

In this example, when resource usage of a control chip in the plurality of control chips exceeds the first threshold, some application software currently run by the control chip may be redeployed to another control chip, so that running pressure of the first control chip can be effectively relieved, thereby ensuring normal running of another first application software on the first control chip, and making a software architecture of a vehicle have better scalability.

According to this embodiment of the present disclosure, in a process of running application software at an application layer, running states of the plurality of control chips are obtained, and a configuration instruction of running the first application software is sent to the second control chip in the plurality of control chips when a running state of the first control chip in the plurality of control chips indicates that any of set events occurs in the first control chip, so as to migrate the first application software currently run by the first control chip to the second control chip for running, so that application software can be dynamically deployed, thereby implementing flexible extension of the application software. In addition, redundancy protection on a fault of a control chip can be implemented, thereby ensuring normal running of all application software, and improving reliability of running of the software architecture of the vehicle.

FIG. 7 is a schematic flowchart of another vehicle control method according to an embodiment of the present disclosure. The vehicle control method is implemented by a control chip. As shown in FIG. 7, the vehicle control method may include step S7100 and step S7200.

Step S7100: A configuration instruction sent by a processor is received.

Step S7200: First application software is run in response to the configuration instruction, where the first application software is application software currently run by a first control chip, and the first control chip is a control chip in which any of set events occurs in a plurality of control chips of a vehicle.

In this embodiment, a hardware layer of a software architecture of the vehicle includes the plurality of control chips, and the plurality of control chips may include the first control chip and a second control chip. During specific implementation, the second control chip receives the configuration instruction sent by the processor. The second control chip runs the first application software in response to the configuration instruction.

In this embodiment, the set event includes at least one of a running fault and resource usage exceeding a first threshold. The configuration instruction includes a first configuration instruction and a second configuration instruction.

When the configuration instruction is the first configuration instruction, the first configuration instruction is a configuration instruction that is for running all first application software and that is sent to the second control chip when the running fault occurs in the first control chip. The second control chip runs all the first application software in response to the first configuration instruction.

When the configuration instruction is the second configuration instruction, the second configuration instruction is a configuration instruction that is for running some first application software and that is sent to the second control chip when the resource usage of the first control chip exceeds the first threshold. The second control chip runs the some first application software in response to the second configuration instruction.

According to this embodiment of the present disclosure, the configuration instruction sent by the processor is received, and the first application software is run in response to the configuration instruction, so as to migrate the first application software currently run by the first control chip to the second control chip for running, so that application software can be dynamically deployed, thereby implementing flexible extension of the application software. In addition, redundancy protection on a fault of a control chip can be implemented, thereby ensuring normal running of all application software, and improving reliability of running of the software architecture of the vehicle.

In an embodiment, the software architecture of the vehicle includes middleware, the middleware includes multiple atomization services, and that first application software is run may further include: An atomization service corresponding to the first application software is selected from the multiple atomization services. The atomization service corresponding to the first application software is invoked, and service data of the atomization service corresponding to the first application software is obtained, to generate a control instruction based on the service data. A corresponding processor is controlled to execute a function corresponding to the first application software according to the control instruction.

The atomization service is a non-decomposable basic service unit that constitutes an application, and is also a minimum unit that an operating system can manage and allocate a permission to. The atomization service may be shared by multiple application software. It may be understood herein that the atomization service may be designed based on application software to be run. For example, the atomization service may include a video service, a millimeter wave radar service, a lidar service, a location service, a camera service, or the like.

The corresponding processor may be a processor configured to execute the control instruction.

An example of running NOA application software is used. The video service, the millimeter wave radar service, the lidar service, and the location service in the multiple atomization services are invoked. An obstacle perception result is obtained based on service data of the video service, the millimeter wave radar service, the lidar service, and the location service. A control instruction is generated based on the obstacle perception result, and the control instruction is sent to a corresponding processor, to cause the processor to execute the control instruction, thereby implementing a navigate on autopilot function.

In this embodiment, by designing the atomization service of the middleware, application software at an application layer can be decoupled from lower-layer software and hardware, and application software can be flexibly deployed on different control chips at the hardware layer. In addition, redundancy protection on a fault of a control chip can be implemented, thereby ensuring normal running of all application software, and improving reliability of running of the software architecture of the vehicle.

Figure 8:
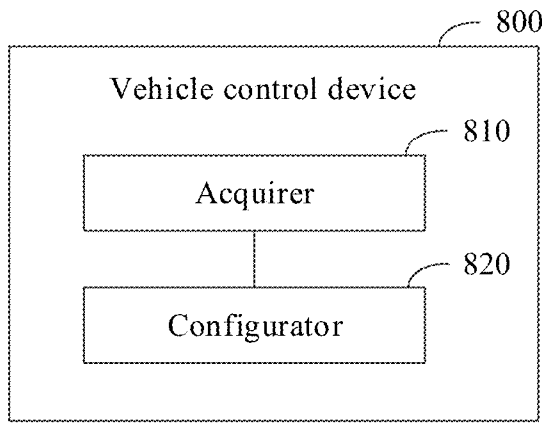
FIG. 8 is a schematic diagram 1 of a hardware structure of a vehicle control device according to an embodiment of the present disclosure.

FIG. 8 shows a vehicle control device according to an embodiment of the present disclosure. The vehicle control device is used in a processor. The processor is communicatively connected to a plurality of control chips. As shown in FIG. 8, the vehicle control device 800 may include an acquirer 810 and a configurator 820.

The acquirer 810 may be configured to obtain running states of the plurality of control chips.

The configurator 820 may be configured to send a configuration instruction of running first application software to a second control chip in the plurality of control chips when a running state of a first control chip in the plurality of control chips indicates that any of set events occurs in the first control chip. The first application software is application software currently run by the first control chip.

In an embodiment, the set event includes at least one of a running fault and resource usage exceeding a first threshold.

In an embodiment, the set event includes the running fault, and the configurator 820 is specifically configured to send a first configuration instruction of running all first application software to the second control chip when the running state of the first control chip indicates that a running fault occurs in the first control chip.

In an embodiment, the set event includes the resource usage exceeding the first threshold, and the configurator 820 is specifically configured to send a second configuration instruction of running some first application software to the second control chip when the running state of the first control chip indicates that resource usage of the first control chip exceeds the first threshold.

In an embodiment, the sending a second configuration instruction of running some first application software to the second control chip includes: based on a first parameter of all first application software currently run by the first control chip, selecting some first application software from all the first application software, and sending the second configuration instruction of running the some first application software to the second control chip. The first parameter includes at least one of a load value and a priority.

In an embodiment, the first parameter is a load value, and the some first application software is first application software having a largest load value in all the first application software.

In an embodiment, the first parameter is a priority, and the some first application software is first application software having a lowest priority in all the first application software.

In an embodiment, the second control chip is any one of control chips in which the set event does not occur in the plurality of control chips. Alternatively, the second control chip is a control chip in which the set event does not occur and that has a smallest load value in the plurality of control chips.

In an embodiment, the vehicle control device 800 may further include: a sending module, configured to send a first message to second application software, to cause the second application software to communicate with the first application software run by the second control chip. The second application software is application software that interacts with the first application software.

According to this embodiment of the present disclosure, in a process of running application software at an application layer, running states of the plurality of control chips are obtained, and a configuration instruction of running the first application software is sent to the second control chip in the plurality of control chips when a running state of the first control chip in the plurality of control chips indicates that any of set events occurs in the first control chip, so as to migrate the first application software currently run by the first control chip to the second control chip for running, so that application software can be dynamically deployed, thereby implementing flexible extension of the application software. In addition, redundancy protection on a fault of a control chip can be implemented, thereby ensuring normal running of all application software, and improving reliability of running of a software architecture of a vehicle.

Figure 9:
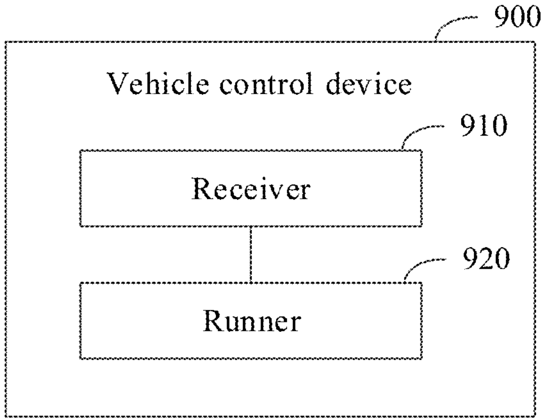
FIG. 9 is a schematic diagram 2 of a hardware structure of a vehicle control device according to an embodiment of the present disclosure.

FIG. 9 shows another vehicle control device according to an embodiment of the present disclosure. The vehicle control device is used in a control chip. As shown in FIG. 9, the vehicle control device 900 may include a receiver 910 and a runner 920.

The receiver 910 may be configured to receive a configuration instruction sent by a processor.

The runner 920 may be configured to run the first application software in response to the configuration instruction. The first application software is application software currently run by a first control chip, and the first control chip is a control chip in which any of set events occurs in a plurality of control chips of a vehicle.

In an embodiment, a software architecture of a vehicle includes middleware, the middleware includes multiple atomization services, and the runner 920 is specifically configured to: select an atomization service corresponding to the first application software from the multiple atomization services; invoke the atomization service corresponding to the first application software, and obtain service data of the atomization service corresponding to the first application software, to generate a control instruction based on the service data; and control a corresponding processor to execute a function corresponding to the first application software according to the control instruction.

According to this embodiment of the present disclosure, the configuration instruction sent by the processor is received, and the first application software is run in response to the configuration instruction, so as to migrate the first application software currently run by the first control chip to a second control chip for running, so that application software can be dynamically deployed, thereby implementing flexible extension of the application software. In addition, redundancy protection on a fault of a control chip can be implemented, thereby ensuring normal running of all application software, and improving reliability of running of the software architecture of the vehicle.

Figure 10:
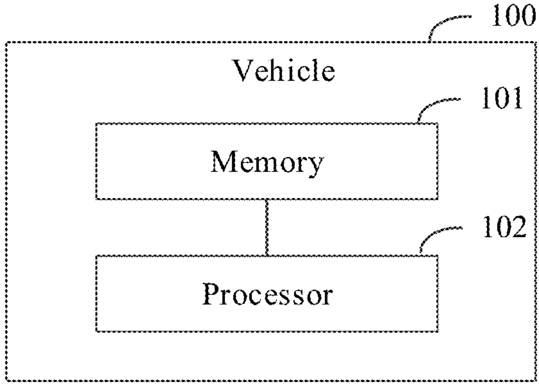
FIG. 10 is a schematic diagram of a hardware structure of a vehicle according to an embodiment of the present disclosure.

FIG. 10 shows a vehicle according to an embodiment of the present disclosure. As shown in FIG. 10, the vehicle 100 includes a memory 101 and a processor 102. The memory 101 is configured to store computer-executable instructions. The processor 102 is configured to perform the vehicle control method according to the foregoing embodiment based on control of the computer-executable instructions.

In this embodiment, a software architecture of the vehicle 100 is shown in FIG. 1.

An embodiment of the present disclosure further provides a computer-readable storage medium. The computer-readable storage medium stores computer instructions that can be read and run by a computer. When the computer instructions are run by a processor, the vehicle control method according to the foregoing embodiment is performed.

The embodiments of this specification are all described in a progressive manner. Mutual reference may be made for same or similar parts in the embodiments. Descriptions of each embodiment focus on a difference from other embodiments. However, a person skilled in the art should clearly understand that the foregoing embodiments may be used alone or in combination with each other as necessary. In addition, device embodiments basically correspond to method embodiments, and therefore are described briefly. For related parts, refer to partial descriptions in the method embodiment. The system embodiments described above are merely examples, and the modules described as separate parts may or may not be physically separate.

The present disclosure may be implemented as a system, a method, and/or a computer program product. The computer program product may include a computer-readable storage medium that carries computer-readable program instructions of causing a processor to implement the aspects of the present disclosure.

The computer-readable storage medium may be a tangible device that can maintain and store instructions used by an instruction execution device. The computer-readable storage medium may be, for example, but is not limited to, an electric storage device, a magnetic storage device, an optical storage device, an electromagnetic storage device, a semiconductor storage device, or any combination thereof. More specific examples (non-exhaustive lists) of the computer-readable storage medium include: a portable computer disk, a hard disk, a random access memory (RAM), a read-only memory (ROM), an erasable programmable read-only memory (EPROM or flash memory), a static random access memory (SRAM), a compact disc read-only memory (CD-ROM), a digital versatile disc (DVD), a memory stick, a floppy disk, a mechanical coding device, for example, a punched card that stores instructions or a convex structure in a groove, and any appropriate combination thereof. The computer-readable storage medium herein is not interpreted as an instantaneous signal, such as a radio wave or another freely propagated electromagnetic wave, an electromagnetic wave propagated by a waveguide or another transmission medium (for example, an optical pulse propagated by an optical fiber cable), or an electrical signal transmitted by a wire.

The computer-readable program instructions described herein may be downloaded from the computer-readable storage medium to each computing/processing device, or downloaded to an external computer or an external storage device through a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter or a network interface in each computing/processing device receives computer-readable program instructions from the network, and forwards the computer-readable program instructions, so that the computer-readable program instructions are stored in a computer-readable storage medium in each computing/processing device.

Computer program instructions of performing operations of the present disclosure may be assembly instructions, instruction set architecture (ISA) instructions, machine instructions, machine-related instructions, microcode, firmware instructions, state setting data, or source code or target code written in any combination of one or more programming languages. The programming languages include object-oriented programming languages such as Smalltalk and C++, and conventional programming languages such as "language" or similar programming languages. The computer-readable program instructions may be completely executed on a user computer, partially executed on a user computer, executed as an independent software package, partially executed on a user computer and partially executed on a remote computer, or completely executed on a remote computer or server. For the case involving the remote computer, the remote computer may be connected to a computer of a user through any type of network including a local area network (LAN) or a wide area network (WAN), or may be connected to an external computer (for example, through the Internet by using an Internet service provider). In some embodiments, an electronic circuit, such as a programmable logic circuit, a field programmable gate array (FPGA), or a programmable logic array (PLA), may be personalized by using state information of the computer-readable program instructions. The electronic circuit may execute the computer-readable program instructions to implement the aspects of the present disclosure.

The aspects of the present disclosure are described with reference to the flowcharts and/or block diagrams of the method, device (system), and computer program product according to the embodiments of the present disclosure. It should be understood that each block of the flowcharts and/or block diagrams and combinations of blocks in the flowcharts and/or block diagrams can be implemented by the computer-readable program instructions.

These computer-readable program instructions can be provided for a processor of a general-purpose computer, a special-purpose computer, or another programmable data processing device to generate a machine, so that the instructions executed by a processor of the computer or another programmable data processing device generate a device for implementing functions/actions specified in one or more blocks in the flowcharts and/or block diagrams. The computer-readable program instructions may alternatively be stored in a computer-readable storage medium. The instructions enable a computer, a programmable data processing device, and/or another device to work in a specific manner. Therefore, the computer-readable medium that stores the instructions includes a manufacturer that includes instructions of implementing aspects of functions/actions specified in one or more blocks in the flowcharts and/or block diagrams.

The computer-readable program instructions may alternatively be loaded onto a computer, another programmable data processing device, or another device, to cause a series of operational steps to be performed on the computer, the another programmable data processing device, or the another device to produce a computer implemented process, so that the instructions executed on the computer, the another programmable data processing device, or the another device are used to implement functions/actions specified in one or more blocks in the flowcharts and/or block diagrams.

The flowcharts and block diagrams in the accompanying drawings illustrate the architecture, functions, and operations of possible implementations of systems, methods, and computer program products according to multiple embodiments of the present disclosure. In this regard, each box in a flowchart or a block diagram may represent a module, a program segment, or a part of an instruction. The module, the program segment, or the part of the instruction includes one or more executable instructions used for implementing designated logic functions. In some implementations used as substitutes, functions annotated in blocks may alternatively occur in a sequence different from that annotated in the accompanying drawing. For example, actually two blocks shown in succession may be performed basically in parallel, and sometimes the two blocks may be performed in a reverse sequence. This is determined by a related function. It should also be noted that each block in a block diagram and/or a flowchart and a combination of blocks in the block diagram and/or the flowchart may be implemented by using a dedicated hardware-based system configured to perform a designated function or action, or may be implemented by using a combination of special-purpose hardware and a computer instruction. It is well-known to a person skilled in the art that implementation in a hardware manner, implementation in a software manner, and implementation in a combination of software and hardware are equivalent.

The embodiments of the present disclosure have been described above. The foregoing descriptions are exemplary and not exhaustive, and are not limited to the disclosed embodiments. Many modifications and changes are apparent to a person of ordinary skill in the art without departing from the scope and spirit of the described embodiments. The terminology used in this specification is intended to best explain the principles, practical applications, or technical improvements in the market of the embodiments, or to enable others of ordinary skill in the art to understand the embodiments disclosed herein. The scope of the present disclosure is limited only by the appended claims.

What is claimed is:

1. A vehicle control method, comprising:

obtaining running states of a plurality of control chips;

a running state of a first control chip in the plurality of control chips indicating that any of set events occurs in the first control chip; and sending a configuration instruction of running first application software to a second control chip in the plurality of control chips wherein the first application software is application software currently run by the first control chip, wherein the set event comprises the resource usage exceeding the first threshold, and the a running state of a first control chip in the plurality of control chips indicating that any of set events occurs in the first control chip; and sending a configuration instruction of running first application software to a second control chip in the plurality of control chips comprise:

the running state of the first control chip indicates that resource usage of the first control chip exceeds the first threshold; and sending a second configuration instruction of running some first application software to the second control chip.

2. The vehicle control method according to claim 1, wherein the set event comprises at least one of a running fault and resource usage exceeding a first threshold.

3. The vehicle control method according to claim 1, wherein the set event comprises the running fault, and the a running state of a first control chip in the plurality of control chips indicating that any of set events occurs in the first control chip; and sending a configuration instruction of running first application software to a second control chip in the plurality of control chips comprise:

the running state of the first control chip indicating that a running fault occurs in the first control chip;

sending a first configuration instruction of running all first application software to the second control chip.

4. The vehicle control method according to claim 1, wherein the sending a second configuration instruction of running some first application software to the second control chip comprises:

based on a first parameter of all first application software currently run by the first control chip, selecting some first application software from all the first application software, and sending the second configuration instruction of running the some first application software to the second control chip;

wherein the first parameter comprises at least one of a load value and a priority.

5. The vehicle control method according to claim 4, wherein the first parameter is a load value, and the some first application software is first application software having a largest load value in all the first application software.

6. The vehicle control method according to claim 4, wherein the first parameter is a priority, and the some first application software is first application software having a lowest priority in all the first application software.

7. The vehicle control method according to claim 1, wherein the second control chip is any one of control chips in which the set event does not occur in the plurality of control chips; or the second control chip is a control chip in which the set event does not occur and that has a smallest load value in the plurality of control chips.

8. The vehicle control method according to claim 1, wherein after the sending a configuration instruction of running first application software to a second control chip in the plurality of control chips, the method further comprises:

sending a first message to second application software, to cause the second application software to communicate with the first application software run by the second control chip;

wherein the second application software is application software that interacts with the first application software.

9. A vehicle control method, comprising:

receiving a configuration instruction sent by a processor; and running first application software in response to the configuration instruction;

wherein the first application software is application software currently run by a first control chip, and the first control chip is a control chip in which any of set events occurs in a plurality of control chips of a vehicle, wherein a software architecture of the vehicle comprises middleware, the middleware comprises multiple atomization services, and the running first application software comprises:

selecting an atomization service corresponding to the first application software from the multiple atomization services;

invoking the atomization service corresponding to the first application software, and obtaining service data of the atomization service corresponding to the first application software, to generate a control instruction based on the service data; and controlling a corresponding processor to execute a function corresponding to the first application software according to the control instruction.

10. A vehicle, comprising:

a memory, configured to store computer-executable instructions; and a processor, configured to perform a vehicle control method based on control of the computer-executable instructions, wherein the vehicle control method comprises:

obtaining running states of a plurality of control chips;

a running state of a first control chip in the plurality of control chips indicating that any of set events occurs in the first control chip; and sending a configuration instruction of running first application software to a second control chip in the plurality of control chips wherein the first application software is application software currently run by the first control chip, wherein the set event comprises the resource usage exceeding the first threshold, and the a running state of a first control chip in the plurality of control chips indicating that any of set events occurs in the first control chip; and sending a configuration instruction of running first application software to a second control chip in the plurality of control chips comprise:

the running state of the first control chip indicates that resource usage of the first control chip exceeds the first threshold; and sending a second configuration instruction of running some first application software to the second control chip.

11. The vehicle according to claim 10, wherein the set event comprises at least one of a running fault and resource usage exceeding a first threshold.

12. The vehicle according to claim 10, wherein the set event comprises the running fault, and the a running state of a first control chip in the plurality of control chips indicating that any of set events occurs in the first control chip; and sending a configuration instruction of running first application software to a second control chip in the plurality of control chips comprise:

the running state of the first control chip indicating that a running fault occurs in the first control chip;

sending a first configuration instruction of running all first application software to the second control chip.

13. The vehicle according to claim 10, wherein the sending a second configuration instruction of running some first application software to the second control chip comprises:

based on a first parameter of all first application software currently run by the first control chip, selecting some first application software from all the first application software, and sending the second configuration instruction of running the some first application software to the second control chip;

wherein the first parameter comprises at least one of a load value and a priority.

14. The vehicle according to claim 13, wherein the first parameter is a load value, and the some first application software is first application software having a largest load value in all the first application software.

15. The vehicle according to claim 13, wherein the first parameter is a priority, and the some first application software is first application software having a lowest priority in all the first application software.

16. The vehicle according to claim 10, wherein the second control chip is any one of control chips in which the set event does not occur in the plurality of control chips; or the second control chip is a control chip in which the set event does not occur and that has a smallest load value in the plurality of control chips.

17. The vehicle according to claim 10, wherein after the sending a configuration instruction of running first application software to a second control chip in the plurality of control chips, the method further comprises:

sending a first message to second application software, to cause the second application software to communicate with the first application software run by the second control chip;

wherein the second application software is application software that interacts with the first application software.

* * * * *